(12) United States Patent
Li et al.

(10) Patent No.: US 10,560,382 B2
(45) Date of Patent: Feb. 11, 2020

(54) DATA TRANSMISSION METHOD AND APPARATUS

(71) Applicant: Huawei Technologies Co., Ltd., Shenzhen (CN)

(72) Inventors: Jin Li, Nanjing (CN); Feng Li, Nanjing (CN); Yihong Huang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 163 days.

(21) Appl. No.: 15/625,638

(22) Filed: Jun. 16, 2017

(65) Prior Publication Data
US 2017/0289041 A1    Oct. 5, 2017

Related U.S. Application Data

(63) Continuation of application No. PCT/CN2015/088794, filed on Sep. 1, 2015.

(30) Foreign Application Priority Data

Dec. 19, 2014   (CN) .......................... 2014 1 0799680

(51) Int. Cl.
*H04L 12/801* (2013.01)
*H04L 29/06* (2006.01)

(52) U.S. Cl.
CPC .............. *H04L 47/12* (2013.01); *H04L 69/16* (2013.01)

(58) Field of Classification Search
CPC ....... H04L 47/12; H04L 69/16; H04L 69/163; H04L 69/24; H04L 29/06; H04L 69/161; H04L 47/193; H04L 47/27; H04L 69/162
See application file for complete search history.

(56) References Cited

U.S. PATENT DOCUMENTS

| 6,381,215 B1 | 4/2002 | Hamilton et al. |
| 2003/0182437 A1 | 9/2003 | Kobayashi et al. |

(Continued)

FOREIGN PATENT DOCUMENTS

| CN | 1764184 A | 4/2006 |
| CN | 101102157 A | 1/2008 |

(Continued)

OTHER PUBLICATIONS

Hernandez-Valencia, E., "Architectures for Broadband Residential IP Services Over CATV Networks," IEEE Network, vol. 11, Issue 1, Jan./Feb. 1997, pp. 36-43.

(Continued)

*Primary Examiner* — Will W Lin
(74) *Attorney, Agent, or Firm* — Slater Matsil, LLP

(57) ABSTRACT

A data transmission method and an apparatus are provided. The data transmission method in the present invention includes: determining, by a first device and according to data stream information, whether a data transfer protocol TCP parameter in a data stream corresponding to the data stream information needs to be modified, where the data stream information includes at least one of the following information: information about the first device, information about a second device, service information, or network status information; if determining that the TCP parameter needs to be modified, modifying, by the first device, the TCP parameter, to obtain a modified TCP parameter; and generating, by the first device, a modification result of the TCP parameter.

17 Claims, 6 Drawing Sheets

(56) References Cited

U.S. PATENT DOCUMENTS

| | | |
|---|---|---|
| 2005/0165948 A1* | 7/2005 | Hatime .................. H04L 47/10 709/235 |
| 2006/0031518 A1 | 2/2006 | Jennings, III |
| 2007/0226347 A1 | 9/2007 | Chu et al. |
| 2007/0226375 A1 | 9/2007 | Chu et al. |
| 2008/0101237 A1 | 5/2008 | Ogura et al. |
| 2008/0165723 A1* | 7/2008 | Kim ...................... H04L 47/10 370/318 |
| 2009/0161680 A1* | 6/2009 | Ishikawa ................ H04L 69/16 370/400 |
| 2010/0011270 A1* | 1/2010 | Yamamoto ............. H04L 47/10 714/748 |
| 2011/0125915 A1 | 5/2011 | Takei et al. |
| 2012/0140621 A1* | 6/2012 | Wu ....................... H04L 69/163 370/230 |
| 2014/0036662 A1* | 2/2014 | Takeshima ............ H04L 49/505 370/229 |
| 2014/0040488 A1* | 2/2014 | Small .................... H04L 67/143 709/228 |
| 2014/0074912 A1* | 3/2014 | Nishimoto ........ H04L 29/06047 709/203 |
| 2014/0089471 A1* | 3/2014 | Pianese ................. H04W 80/06 709/219 |
| 2014/0192639 A1 | 7/2014 | Smirnov |
| 2014/0281018 A1 | 9/2014 | Waclawsky et al. |
| 2014/0286174 A1* | 9/2014 | Iizuka .................... H04L 43/12 370/241 |
| 2014/0355623 A1 | 12/2014 | Waclawsky et al. |
| 2014/0369199 A1 | 12/2014 | Choi et al. |
| 2016/0066335 A1* | 3/2016 | Clevorn .............. H04W 72/085 370/329 |
| 2017/0041232 A1* | 2/2017 | Williams ................ H04L 47/11 |

FOREIGN PATENT DOCUMENTS

| | | |
|---|---|---|
| CN | 101146124 A | 3/2008 |
| CN | 101662842 A | 3/2010 |
| CN | 102404187 A | 4/2012 |
| CN | 103079232 A | 5/2013 |
| CN | 103647759 A | 3/2014 |
| JP | H09214547 A | 8/1997 |
| JP | 2001189754 A | 7/2001 |
| JP | 2003256321 A | 9/2003 |
| JP | 2008118281 A | 5/2008 |
| JP | 2008518531 A | 5/2008 |
| JP | 2009200858 A | 9/2009 |
| JP | 2010035033 A | 2/2010 |
| JP | 2013229834 A | 11/2013 |
| WO | 2006045345 A2 | 5/2006 |
| WO | 2014077459 A1 | 5/2014 |

OTHER PUBLICATIONS

Jie, L., "Performance Evaluation of Different TCP Congestion Control Schemes in 4G System," Vaasan Ammattikorkeakoulu University of Applied Sciences, Information Technology, 2013, 58 pages.

Jacobson, V., et al., "TCP Extensions for High Performance," Network Working Group RFC 1323, May 1992, 37 pages.

Du, S., "Understanding Speed Optimization from a TCP Perspective," @Taobao—Core System R and D—Server Platform Group, Mar. 12, 2013, 102 pages.

Information Sciences Institute, "Transmission Control Protocol, DARPA Internet Program Protocol Specification," RFC 793, Sep. 1981, 90 pages.

Huang, R., et al., "Traditional TCP Problem Statment draft-huang-tsvwg-tr-tcp-ps-00," Internet Draft, Jul. 1, 2014, 8 pages.

\* cited by examiner

DATA TRANSMISSION METHOD AND APPARATUS

CROSS-REFERENCE TO RELATED APPLICATIONS

This application is a continuation of International Application No. PCT/CN2015/088794, filed on Sep. 01, 2015, which claims priority to Chinese Patent Application No. 201410799680.8, filed on Dec. 19, 2014. The disclosures of the aforementioned applications are hereby incorporated by reference in their entireties.

TECHNICAL FIELD

Embodiments of the present invention relate to the field of computer technologies, and in particular, to a data transmission method and an apparatus.

BACKGROUND

A Transmission Control Protocol (TCP) is a connection-oriented, reliable, and byte stream-based transport layer communications protocol. In this protocol, a user is provided with multiple modification parameters, so that the user can modify corresponding parameters for different network statuses to improve data transmission efficiency.

In the prior art, a TCP parameter is modified in this manner: The TCP parameter stored in a system file is modified, then the system file is saved after modification, and finally a corresponding command is executed to enable the modification to take effect.

However, during execution of the foregoing process, the inventor finds that the prior art has the following problems: One user may be corresponding to multiple services, and each service is corresponding to one TCP stream, that is, one user is corresponding to multiple TCP streams. If the TCP parameter is modified on a user side, because the modified TCP parameter is a global parameter, after a specific TCP parameter in a TCP stream corresponding to a specific user is modified, the TCP parameter in all TCP streams of the user is modified. If the TCP parameter is modified on a server side, after a specific TCP parameter in a TCP stream of a specific user is modified, the TCP parameter in all TCP streams of another user is also modified. However, for some users or some services of a server, the TCP parameter in TCP streams corresponding to some users or some services of the server does not need to be modified. Therefore, precision of modifying the TCP parameter is not high.

SUMMARY

Embodiments of the present invention provide a data transmission method and an apparatus, so as to resolve a problem in the prior art that precision of modifying a TCP parameter is not high.

According to a first aspect, an embodiment of the present invention provides a data transmission method. The method includes determining, by a first device and according to data stream information, whether a data transfer protocol TCP parameter in a data stream corresponding to the data stream information needs to be modified, where the data stream information includes at least one of the following information: information about the first device, information about a second device, service information, or network status information. The method also includes, if determining that the TCP parameter needs to be modified, modifying, by the first device, the TCP parameter, to obtain a modified TCP parameter. The method also includes generating, by the first device, a modification result of the TCP parameter.

With reference to the first aspect, in a first possible implementation manner of the first aspect, before the generating, by the first device, a modification result of the TCP parameter, the method further includes: sending, by the first device, a data transfer protocol negotiation request message to the second device, where the data transfer protocol negotiation request message includes the modified TCP parameter; and the data transfer protocol negotiation request message is used to request the second device to determine whether the modified TCP parameter meets a preset modification condition; and the generating, by the first device, a modification result of the TCP parameter includes: receiving, by the first device, a feedback message sent by the second device, and generating the modification result of the TCP parameter according to the feedback message.

With reference to the first aspect, or the first possible implementation manner of the first aspect, in a second possible implementation manner of the first aspect, the data transfer protocol negotiation request message is a data transfer protocol packet; and the modified TCP parameter is used as an option in the data transfer protocol packet.

With reference to any one of the first aspect, or the first to the second possible implementation manners of the first aspect, in a third possible implementation manner of the first aspect, the modifying, by the first device, the TCP parameter, to obtain a modified TCP parameter includes: generating, by the first device, a first socket corresponding to the data stream; and modifying, by the first device, the TCP parameter by using a data transfer protocol modification interface corresponding to the first socket, to obtain the modified TCP parameter.

With reference to the third possible implementation manner of the first aspect, in a fourth possible implementation manner of the first aspect, the data transfer protocol modification interface includes: a general socket programming interface and a new application programming interface API.

With reference to any one of the first aspect, or the first to the fourth possible implementation manners of the first aspect, in a fifth possible implementation manner of the first aspect, the TCP parameter includes any one or more of the following items: an initial congestion window; a congestion window for retransmission after timeout; a congestion window for fast recovery; a slow start threshold; a slow start threshold for retransmission after timeout; a congestion window threshold for fast recovery; a slow start step; a congestion avoidance step; a congestion control algorithm; a receive window; a slow start ACK response frequency; a congestion avoidance ACK response frequency; a fast recovery ACK response frequency; a normal transmission ACK response frequency; or a maximum packet length.

According to a second aspect, an embodiment of the present invention provides a first device. The first device includes a determining module, configured to determine, according to data stream information, whether a data transfer protocol TCP parameter in a data stream corresponding to the data stream information needs to be modified, where the data stream information includes at least one of the following information: information about the first device, information about a second device, service information, or network status information. The first device also includes a modification module, configured to: if the determining module determines that the TCP parameter needs to be modified, modify the TCP parameter, to obtain a modified TCP parameter. The first device also includes a generation module, configured to generate a modification result of the TCP parameter.

With reference to the second aspect, in a first possible implementation manner of the second aspect, the first device further includes: a sending module, configured to send a data transfer protocol negotiation request message to the second device, where the data transfer protocol negotiation request message includes the modified TCP parameter; and the data transfer protocol negotiation request message is used to request the second device to determine whether the modified TCP parameter meets a preset modification condition; and a receiving module, configured to receive a feedback message sent by the second device. The generation module is specifically configured to: generate the modification result of the TCP parameter according to the feedback message.

With reference to the second aspect, or the first possible implementation manner of the second aspect, in a second possible implementation manner of the second aspect, the data transfer protocol negotiation request message is a data transfer protocol packet; and the modified TCP parameter is used as an option in the data transfer protocol packet.

With reference to any one of the second aspect, or the first to the second possible implementation manners of the second aspect, in a third possible implementation manner of the second aspect, the modification module is specifically configured to: generate a first socket corresponding to the data stream; and modify the TCP parameter by using a data transfer protocol modification interface corresponding to the first socket, to obtain the modified TCP parameter.

With reference to the third possible implementation manner of the second aspect, in a fourth possible implementation manner of the second aspect, the data transfer protocol modification interface includes: a general socket programming interface and a new application programming interface API.

With reference to any one of the second aspect, or the first to the fourth possible implementation manners of the second aspect, in a fifth possible implementation manner of a second aspect, the TCP parameter includes any one or more of the following items: an initial congestion window; a congestion window for retransmission after timeout; a congestion window for fast recovery; a slow start threshold; a slow start threshold for retransmission after timeout; a congestion window threshold for fast recovery; a slow start step; a congestion avoidance step; a congestion control algorithm; a receive window; a slow start ACK response frequency; a congestion avoidance ACK response frequency; a fast recovery ACK response frequency; a normal transmission ACK response frequency; or a maximum packet length.

According to a third aspect, an embodiment of the present invention provides a second device. The second device includes a receiving module, configured to receive a data transfer protocol negotiation request message sent by a first device, where the data transfer protocol negotiation request message includes a TCP parameter modified by the first device. The second device also includes a processing module, configured to determine whether the modified TCP parameter meets a preset modification condition. The second device also includes a sending module, configured to: generate a feedback message, and send the feedback message to the first device.

With reference to the third aspect, in a first possible implementation manner of the third aspect, the TCP parameter includes any one or more of the following items: an initial congestion window; a congestion window for retransmission after timeout; a congestion window for fast recovery; a slow start threshold; a slow start threshold for retransmission after timeout; a congestion window threshold for fast recovery; a slow start step; a congestion avoidance step; a congestion control algorithm; a receive window; a slow start ACK response frequency; a congestion avoidance ACK response frequency; a fast recovery ACK response frequency; a normal transmission ACK response frequency; or a maximum packet length.

According to the data transmission method and the apparatus in the embodiments of the present invention, a first device determines, according to data stream information, whether a data transfer protocol TCP parameter in a data stream corresponding to the data stream information needs to be modified, where the data stream information includes at least one of the following information: information about the first device, information about a second device, service information, or network status information; if determining that the TCP parameter needs to be modified, the first device modifies the TCP parameter, to obtain a modified TCP parameter; and the first device generates a modification result of the TCP parameter, so that data transfer protocol TCP parameters corresponding to data streams of different services of different users are modified according to the data streams. This resolves a problem in the prior art that precision of modifying a TCP parameter is not high.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
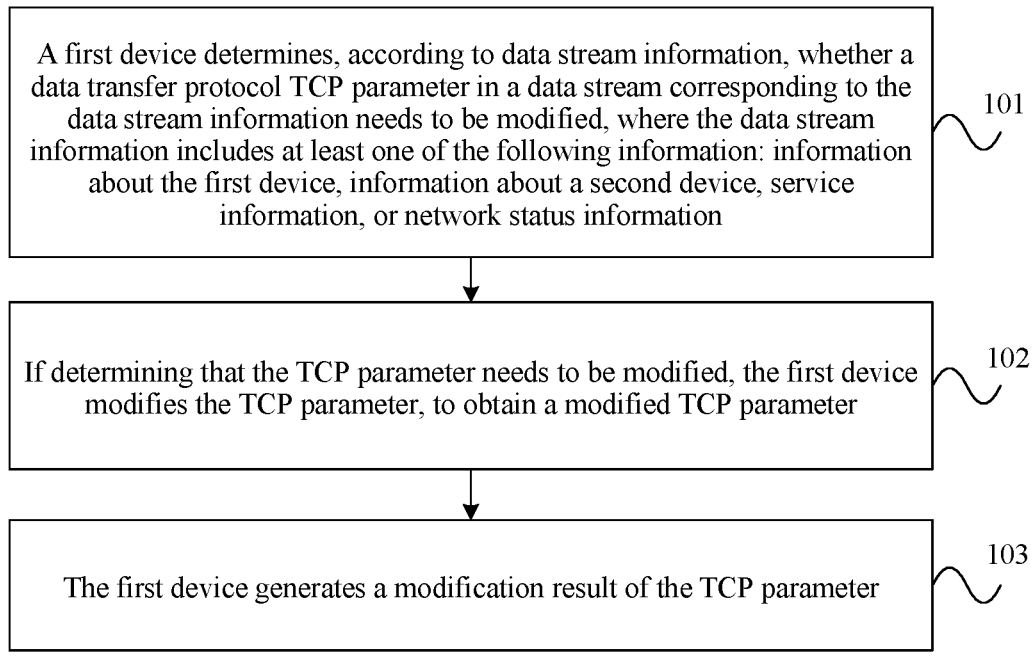
FIG. 1 is a flowchart of an embodiment of a data transmission method according to the present invention.

FIG. 1 is a flowchart of an embodiment of a data transmission method according to the present invention. An execution body of this embodiment is a first device. For example, the first device may be a transmit end or a receive end of the TCP. That is, the first device may be a server or a client device. As shown in FIG. 1, the data transmission method provided in this embodiment includes the following steps.

Step 101: The first device determines, according to data stream information, whether a data transfer protocol TCP parameter in a data stream corresponding to the data stream information needs to be modified, where the data stream information includes at least one of the following information: information about the first device, information about a second device, service information, or network status information.

Step 102: If determining that the TCP parameter needs to be modified, the first device modifies the TCP parameter, to obtain a modified TCP parameter.

Step 103: The first device generates a modification result of the TCP parameter.

Specifically, in this embodiment of the present invention, to meet different service requirements and dynamically changing networks, the TCP parameter may be dynamically adjusted based on a TCP stream corresponding to a service, that is, the first device modifies the TCP parameter corresponding to the data stream. The TCP parameter includes an initial congestion window, a congestion window for retransmission after timeout, a congestion window for fast recovery, and the like.

First, whether the TCP parameter needs to be modified is determined according to the data stream information. Specifically, determining may be performed according to at least one of the following information: the information about the first device, the information about the second device, the service information, or the network status information. For example, when the first device is a server, at least one of information about the server, information about a second device (that is, a client device of a user), service information, or network status information may be determined. The network status information includes network bandwidth and the like; the information about the first device includes a transmit and receive capability of the device, a processing capability of a central processing unit CPU, a size of a cache, a storage space size of a hard disk, and the like; and the information about the second device is similar to the foregoing information, and may further include a rate of an interface, a type of a terminal, and the like. The information about the second device may be sent in advance to the first device. That is, the information about the second device may be obtained when the first device interacts with the second device during establishment of a TCP connection.

In this embodiment, the first device may modify the TCP parameter without negotiating with the second device. The first device may be, for example, a transmit end of a TCP data stream, and in this case, the second device is a receive end. After modifying the TCP parameter, the first device directly generates a modification result of the successful modification.

In the embodiments of the present invention, different TCP streams on a same physical server may be flexibly modified. For example, for a web browsing application in which a small object is generally involved, an initial congestion window may be set according to a size of the object; for downloading of a large file, a slow start step, a congestion window for retransmission after timeout, and a congestion window for fast recovery may increase, so that a large-granularity file may be faster downloaded.

According to the embodiments of the present invention, the TCP is fully opened. A congestion control algorithm may be modified, and all parameters of the TCP are appropriate for various services, users and networks, and ever-changing service requirements, user requirements, and network statuses. For example, when a same physical server serves both a 2nd generation (2G) user and a fiber to the home (FTTH) fiber user, the server may set different congestion control algorithms based on different TCP streams of the users. For example, the FTTH fiber user uses a CUBIC algorithm; when a packet loss occurs, fast recovery may be performed; and an application scenario of this algorithm is mainly a current high-speed network. The 2G user uses a conventional congestion control algorithm; when a packet loss is caused by network congestion, because a large quantity of packets are not continuously sent, a status does not deteriorate; and an application scenario of this algorithm is mainly a low-speed network in the past.

In this embodiment, a first device modifies a TCP parameter corresponding to a data stream to generate a modification result of the TCP parameter, so that data transfer protocol TCP parameters corresponding to data streams of different services of different users are modified according to the data streams. This resolves a problem in the prior art that precision of modifying a TCP parameter is not high.

In another embodiment of the method in the present invention, on the basis of the embodiment shown in FIG. 1, before the generating, by the first device, a modification result of the TCP parameter, the method further includes: sending, by the first device, a data transfer protocol negotiation request message to the second device, where the data transfer protocol negotiation request message includes the modified TCP parameter; and the data transfer protocol negotiation request message is used to request the second device to determine whether the modified TCP parameter meets a preset modification condition. The generating, by the first device, a modification result of the TCP parameter includes: receiving, by the first device, a feedback message sent by the second device, and generating the modification result of the TCP parameter according to the feedback message.

Optionally, the data transfer protocol negotiation request message is a data transfer protocol packet; and the modified TCP parameter is used as an option in the data transfer protocol packet.

Specifically, in this embodiment, the first device may need to negotiate with the second device when modifying the TCP parameter, and the TCP parameter includes a congestion control algorithm, an initial congestion window, a receive window, a slow start ACK response frequency, a congestion avoidance ACK response frequency, and the like.

For example, conventional congestion control algorithms are designed based on a low-speed network; a binary increase Transmission Control Protocol (BIC), a binary increase Transmission Control Protocol used in a fast long-distance network (CUBIC), and a compound Transmission Control Protocol (compound TCP) are designed based on a high-speed network. Because users served by a same server may include both a user of a low-speed network and a user of a high-speed network, TCP parameters need to be adjusted based on different users to meet requirements of the different users. In addition, different TCP parameters may be set for different services; for example, for a Google search engine service, an initial congestion window (InitCwnd) of the TCP is set to 16, so that a delay is the lowest; and for Taobao whose file size is different from that of Google, the InitCwnd of the TCP is set to 7, so that service experience is the best.

After modifying the TCP parameter, the first device needs to negotiate with the second device, and the second device determines whether the modified TCP parameter meets the preset modification condition. The preset modification condition is, for example, whether the modified TCP parameter is within a range allowed by the second device; the first device may be, for example, the transmit end (for example, the server) of the TCP data stream, and in this case, the second device is the receive end (the client device). During negotiation, the data transfer protocol negotiation request message may be sent, and the data transfer protocol negotiation request message includes the modified TCP parameter. After determining the modified TCP parameter, the second device performs feedback and sends the feedback message. After receiving the feedback message, the first device generates the modification result: if the preset modification condition is met, a modification result of the successful modification is generated, or if the preset modification condition is not met, a modification result of the failed modification is generated.

In another embodiment of the method in the present invention, on the basis of the embodiment shown in FIG. 1, in step 101, the modifying, by the first device, the TCP parameter, to obtain a modified TCP parameter includes: generating, by the first device, a first socket corresponding to the data stream; and modifying, by the first device, the TCP parameter by using a data transfer protocol modification interface corresponding to the first socket, to obtain the modified TCP parameter.

Optionally, the data transfer protocol modification interface includes: a general socket programming interface and a new application programming interface API.

Specifically, that the first device modifies the TCP parameter corresponding to the data stream may be implemented by using the following method: generating, by the first device, the first socket corresponding to the data stream, and modifying the TCP parameter by using the data transfer protocol modification interface corresponding to the first socket. Alternatively, the TCP parameter may be modified by using another manner such as a command line or a registry.

In a modification manner in which the data transfer protocol modification interface corresponding to the first socket is used, a general socket programming interface may be used; for example, the TCP parameter may be modified by using the following function: int setsockopt (int s, int level, int optname, const void*optval, socklen_toptlen).

Alternatively, the TCP parameter may be modified by using a new application programming interface API.

Optionally, the TCP parameter includes any one or more of the following items: an initial congestion window; a congestion window for retransmission after timeout; a congestion window for fast recovery; a slow start threshold; a slow start threshold for retransmission after timeout; a congestion window threshold for fast recovery; a slow start step; a congestion avoidance step; a congestion control algorithm; a receive window; a slow start ACK response frequency; a congestion avoidance ACK response frequency; a fast recovery ACK response frequency; a normal transmission ACK response frequency; or a maximum packet length.

The following uses a specific embodiment to describe in detail the technical solution in the method embodiment shown in FIG. 1.

Optionally, when the TCP parameter is the initial congestion window, the modifying, by the first device, the TCP parameter, to obtain a modified TCP parameter includes: calling the data transfer protocol modification interface to modify the initial congestion window corresponding to the data stream, to obtain a modified first initial congestion window, where the first initial congestion window is preset; and the generating, by the first device, a modification result of the TCP parameter includes: after obtaining the modified first initial congestion window, generating, by the first device, the modification result, where the modification result indicates that the first device has modified the initial congestion window.

Specifically, when it is determined, according to at least one of information about the first device, information about a second device, information about a service currently carried in a data stream, or network status information, that the initial congestion window of the TCP needs to be modified, in this case, the TCP parameter is the initial congestion window. The first device (for example, a transmit end) calls the data transfer protocol modification interface to modify the initial congestion window corresponding to the data stream to a more appropriate first initial congestion window, where the first initial congestion window may be preset by the first device. Specifically, the first initial congestion window generally needs to be determined based on a size of a file that needs to be transmitted, a capability of the transmit end, network bandwidth, and the like.

After selecting the appropriate first initial congestion window, the first device generates the modification result, where the modification result indicates that the first device has modified the initial congestion window.

In this embodiment, the transmit end independently modifies the initial congestion window of the TCP without negotiating with a receive end.

Optionally, when the TCP parameter is the congestion window for retransmission after timeout, the modifying, by the first device, the TCP parameter, to obtain a modified TCP parameter includes: calling the data transfer protocol modification interface to modify the congestion window that is for retransmission after timeout and that is corresponding to the data stream, to obtain a modified first congestion window for retransmission after timeout, where the first congestion window for retransmission after timeout is preset; and the generating, by the first device, a modification result of the TCP parameter includes: after obtaining the modified first congestion window for retransmission after timeout, generating, by the first device, the modification result, where the modification result indicates that the first device has modified the congestion window for retransmission after timeout.

Specifically, it is considered that a main reason for network congestion in the TCP is that a packet segment is retransmitted in the TCP. In the TCP, there is a timer for each packet segment, and the timer is referred to as a retransmission timer (RTO). If no acknowledgement for data is received before the RTO expires, the packet segment is retransmitted in the TCP. When a timeout occurs, a possibility of the congestion is very high, and a specific packet segment may be lost somewhere in a network. Therefore, when the network congestion occurs, the congestion window for retransmission after timeout is modified. A slow start is entered during retransmission after timeout.

When it is determined, according to at least one of information about the first device, information about a second device, information about a service currently carried in a data stream, or network status information, that the congestion window that is for retransmission after timeout and that is of the TCP needs to be modified, in this case, the TCP parameter is the congestion window for retransmission after timeout. The first device (for example, a transmit end) calls the data transfer protocol modification interface to modify the congestion window that is for retransmission after timeout and that is corresponding to the data stream to a more appropriate first congestion window for retransmission after timeout, where the first congestion window for retransmission after timeout may be preset by the first device. Specifically, the first congestion window for retransmission after timeout generally needs to be determined based on a size of a file that needs to be transmitted, a capability of a server at the transmit end, network bandwidth, and the like.

After selecting the appropriate first congestion window for retransmission after timeout, the first device generates the modification result, where the modification result indicates that the first device has modified the congestion window for retransmission after timeout.

Optionally, when the TCP parameter is the congestion window for fast recovery, the modifying, by the first device, the TCP parameter, to obtain a modified TCP parameter includes: calling the data transfer protocol modification interface to modify the congestion window that is for fast recovery and that is corresponding to the data stream, to obtain a modified first congestion window for fast recovery, where the first congestion window for fast recovery is preset; and the generating, by the first device, a modification result of the TCP parameter includes: after obtaining the modified first congestion window for fast recovery, generating, by the first device, the modification result, where the modification result indicates that the first device has modified the congestion window for fast recovery.

Specifically, retransmission occurs after a timeout. However, if a transmit end receives at least three duplicate ACKs, the transmit end should be aware that data is lost and needs to be retransmitted. In this mechanism, it is not necessary to wait until a retransmission timer overflows, and therefore, this mechanism is referred to as fast retransmission. After the fast retransmission, because a congestion avoidance algorithm is used instead of slow start, this mechanism is also referred to as a fast recovery algorithm. The fast retransmission and the fast recovery are intended for fast recovery of a lost packet.

When it is determined, according to at least one of information about the first device, information about a second device, information about a service currently carried in a data stream, or network status information, that the congestion window that is for fast recovery and that is of the TCP needs to be modified, in this case, the to-be-modified content is the congestion window for fast recovery. The first device (for example, the transmit end) calls the data transfer protocol modification interface to modify the congestion window that is for fast recovery and that is corresponding to the data stream to a more appropriate first congestion window for fast recovery, where the first congestion window for fast recovery may be preset by the first device. Specifically, the first congestion window for fast recovery generally needs to be determined based on a size of a file that needs to be transmitted, a capability of the transmit end, network bandwidth, and the like.

After selecting the appropriate first congestion window for fast recovery, the first device generates the modification result, where the modification result indicates that the first device has modified the congestion window for fast recovery.

Optionally, when the TCP parameter is the slow start threshold, the modifying, by the first device, the TCP parameter, to obtain a modified TCP parameter includes: calling the data transfer protocol modification interface to modify the slow start threshold corresponding to the data stream, to obtain a modified first slow start threshold, where the first slow start threshold is preset. The generating, by the first device, a modification result of the TCP parameter includes: after obtaining the modified first slow start threshold, generating, by the first device, the modification result, where the modification result indicates that the first device has modified the slow start threshold.

Specifically, when it is determined, according to at least one of information about the first device, information about a second device, information about a service currently carried in a data stream, or network status information, that the slow start threshold of the TCP needs to be modified, in this case, the TCP parameter is the slow start threshold. The first device (for example, a transmit end) calls the data transfer protocol modification interface to modify the slow start threshold corresponding to the data stream to a more appropriate first slow start threshold, where the first slow start threshold may be preset by the first device. Specifically, the first slow start threshold generally needs to be determined based on a size of a file that needs to be transmitted, a capability of the transmit end, network bandwidth, and the like.

After selecting the appropriate first slow start threshold, the first device generates the modification result, where the modification result indicates that the first device has modified the slow start threshold.

Optionally, when the TCP parameter is the slow start threshold for retransmission after timeout, the modifying, by the first device, the TCP parameter, to obtain a modified TCP parameter includes: calling the data transfer protocol modification interface to modify the slow start threshold for retransmission after timeout corresponding to the data stream, to obtain a modified first slow start threshold for retransmission after timeout, where the first slow start threshold for retransmission after timeout is preset; and the generating, by the first device, a modification result of the TCP parameter includes: after obtaining the modified first slow start threshold for retransmission after timeout, generating, by the first device, the modification result, where the modification result indicates that the first device has modified the slow start threshold for retransmission after timeout.

Specifically, when it is determined, according to at least one of information about the first device, information about a second device, information about a service currently carried in a data stream, or network status information, that the slow start threshold for retransmission after timeout of the TCP needs to be modified, in this case, the to-be-modified content is the slow start threshold for retransmission after timeout. The first device (for example, a transmit end) calls the data transfer protocol modification interface to modify the slow start threshold for retransmission after timeout corresponding to the data stream to a more appropriate first slow start threshold for retransmission after timeout, where the first slow start threshold for retransmission after timeout may be preset by the first device. Specifically, the first slow start threshold for retransmission after timeout generally needs to be determined based on a size of a file that needs to be transmitted, a capability of a server at the transmit end, network bandwidth, and the like.

After selecting the appropriate first slow start threshold for retransmission after timeout, the first device generates the modification result, where the modification result indicates that the first device has modified the slow start threshold for retransmission after timeout.

Optionally, when the TCP parameter is the congestion window threshold for fast recovery, the modifying, by the first device, the TCP parameter, to obtain a modified TCP parameter includes: calling the data transfer protocol modification interface to modify the congestion window threshold for fast recovery corresponding to the data stream, to obtain a modified first congestion window threshold for fast recovery, where the first congestion window threshold for fast recovery is preset; and the generating, by the first device, a modification result of the TCP parameter includes: after obtaining the modified first congestion window threshold for fast recovery, generating, by the first device, the modification result, where the modification result indicates that the first device has modified the congestion window threshold for fast recovery.

Specifically, when it is determined, according to at least one of information about the first device, information about a second device, information about a service currently carried in a data stream, or network status information, that the congestion window threshold for fast recovery of the TCP needs to be modified, in this case, the to-be-modified content is the congestion window threshold for fast recovery. The first device (for example, a transmit end) calls the data transfer protocol modification interface to modify the congestion window threshold for fast recovery corresponding to the data stream to a more appropriate first congestion window threshold for fast recovery, where the first congestion window threshold for fast recovery may be preset by the first device. Specifically, the first congestion window threshold for fast recovery generally needs to be determined based on a size of a file that needs to be transmitted, a capability of the transmit end, network bandwidth, and the like.

After selecting the appropriate first congestion window threshold for fast recovery, the first device generates the modification result, where the modification result indicates that the first device has modified the congestion window threshold for fast recovery.

Optionally, when the TCP parameter is the slow start step, the modifying, by the first device, the TCP parameter, to obtain a modified TCP parameter includes: calling the data transfer protocol modification interface to modify the slow start step corresponding to the data stream, to obtain a modified first slow start step, where the first slow start step is preset; and the generating, by the first device, a modification result of the TCP parameter includes: after obtaining the modified first slow start step, generating, by the first device, the modification result, where the modification result indicates that the first device has modified the slow start step.

Specifically, the slow start step is a step at which a transmit end increases a congestion window during slow start. Currently, each time an ACK of a packet is received, the congestion window increases by 1, and in each period of an RTT, the congestion window exponentially increases. However, in a network with a high delay, the slow start step needs to be modified according to an actual situation, so as to reduce duration of the slow start and adapt to a dynamic changing network status when the transmit end reenters a slow start phase during retransmission after timeout.

When it is determined, according to at least one of information about the first device, information about a second device, information about a service currently carried in a data stream, or network status information, that the slow start step of the TCP needs to be modified, in this case, the TCP parameter is the slow start step. The first device (for example, the transmit end) calls the data transfer protocol modification interface to modify the slow start step corresponding to the data stream to a more appropriate first slow start step, where the first slow start step may be preset by the first device. Specifically, the first slow start step generally needs to be determined based on a size of a file that needs to be transmitted, a capability of the transmit end, network bandwidth, and the like.

After selecting the appropriate first slow start step, the first device generates the modification result, where the modification result indicates that the first device has modified the slow start step.

Optionally, when the TCP parameter is the congestion avoidance step, the modifying, by the first device, the TCP parameter, to obtain a modified TCP parameter includes: calling the data transfer protocol modification interface to modify the congestion avoidance step corresponding to the data stream, to obtain a modified first congestion avoidance step, where the first congestion avoidance step is preset; and the generating, by the first device, a modification result of the TCP parameter includes: after obtaining the modified first congestion avoidance step, generating, by the first device, the modification result, where the modification result indicates that the first device has modified the congestion avoidance step.

Specifically, the congestion avoidance step is a step at which a transmit end increases a congestion window during congestion avoidance. Currently, each time an ACK of a packet is received, the congestion window increases by 1/Cwnd, and in each period of an RTT, the congestion window increases by 1. However, in a network with a high delay, the congestion avoidance step needs to be modified according to an actual situation to reduce duration of the congestion avoidance.

When it is determined, according to at least one of information about the first device, information about a second device, information about a service currently carried in a data stream, or network status information, that the congestion avoidance step of the TCP needs to be modified, in this case, the TCP parameter is the congestion avoidance step. The first device (for example, the transmit end) calls the data transfer protocol modification interface to modify the congestion avoidance step corresponding to the data stream to a more appropriate first congestion avoidance step, where the first congestion avoidance step may be preset by the first device. Specifically, the first congestion avoidance step generally needs to be determined based on a size of a file that needs to be transmitted, a capability of a server at the transmit end, network bandwidth, and the like.

After selecting the appropriate first congestion avoidance step, the first device generates the modification result, where the modification result indicates that the first device has modified the congestion avoidance step.

Optionally, when the TCP parameter is the slow start ACK response frequency, the modifying, by the first device, the TCP parameter, to obtain a modified TCP parameter includes: calling the data transfer protocol modification interface to modify the slow start ACK response frequency corresponding to the data stream, to obtain a modified first slow start ACK response frequency, where the first slow start ACK response frequency is preset; and the generating, by the first device, a modification result of the TCP parameter includes: after obtaining the modified first slow start ACK response frequency, generating, by the first device, the modification result, where the modification result indicates that the first device has modified the slow start ACK response frequency.

Specifically, in this embodiment, the slow start ACK response frequency may be determined only by the first device without negotiating with a second device. When it is determined, according to at least one of information about the first device, information about the second device, information about a service currently carried in a data stream, or network status information, that the slow start ACK response frequency of the TCP needs to be modified, in this case, the TCP parameter is the slow start ACK response frequency. The first device (for example, a transmit end) calls the data transfer protocol modification interface to modify the slow start ACK response frequency corresponding to the data stream to a more appropriate first slow start ACK response frequency, where the first slow start ACK response frequency may be preset by the first device. Specifically, the first slow start ACK response frequency generally needs to be determined based on a size of a file that needs to be transmitted, a capability of the transmit end, network bandwidth, and the like.

After selecting the appropriate first slow start ACK response frequency, the first device generates the modification result, where the modification result indicates that the first device has modified the slow start ACK response frequency.

Optionally, when the TCP parameter is the congestion avoidance ACK response frequency, the modifying, by the first device, the TCP parameter, to obtain a modified TCP parameter includes: calling the data transfer protocol modification interface to modify the congestion avoidance ACK response frequency corresponding to the data stream, to obtain a modified first congestion avoidance ACK response frequency, where the first congestion avoidance ACK response frequency is preset; and the generating, by the first device, a modification result of the TCP parameter includes: after obtaining the modified first congestion avoidance ACK response frequency, generating, by the first device, the modification result, where the modification result indicates that the first device has modified the congestion avoidance ACK response frequency.

Specifically, in this embodiment, the congestion avoidance ACK response frequency may be determined only by the first device without negotiating with a second device. When it is determined, according to at least one of information about the first device, information about the second device, information about a service currently carried in a data stream, or network status information, that the congestion avoidance ACK response frequency of the TCP needs to be modified, in this case, the TCP parameter is the congestion avoidance ACK response frequency. The first device (for example, a transmit end) calls the data transfer protocol modification interface to modify the congestion avoidance ACK response frequency corresponding to the first service to a more appropriate first congestion avoidance ACK response frequency, where the first congestion avoidance ACK response frequency may be preset by the first device. Specifically, the first congestion avoidance ACK response frequency generally needs to be determined based on a size of a file that needs to be transmitted, a capability of the transmit end, network bandwidth, and the like.

After selecting the appropriate first congestion avoidance ACK response frequency, the first device generates the modification result, where the modification result indicates that the first device has modified the congestion avoidance ACK response frequency.

Optionally, when the TCP parameter is the fast recovery ACK response frequency, the modifying, by the first device, the TCP parameter, to obtain a modified TCP parameter includes: calling the data transfer protocol modification interface to modify the fast recovery ACK response frequency corresponding to the data stream, to obtain a modified first fast recovery ACK response frequency, where the first fast recovery ACK response frequency is preset; and the generating, by the first device, a modification result of the TCP parameter includes: after obtaining the modified first fast recovery ACK response frequency, generating, by the first device, the modification result, where the modification result indicates that the first device has modified the fast recovery ACK response frequency.

In this embodiment, the fast recovery ACK response frequency may be determined only by the first device without negotiating with a second device. When it is determined, according to at least one of information about the first device, information about the second device, information about a service currently carried in a data stream, or network status information, that the fast recovery ACK response frequency of the TCP needs to be modified, in this case, the TCP parameter is the fast recovery ACK response frequency. The first device (for example, a transmit end) calls the data transfer protocol modification interface to modify the fast recovery ACK response frequency corresponding to the data stream to a more appropriate first fast recovery ACK response frequency, where the first fast recovery ACK response frequency may be preset by the first device. Specifically, the first fast recovery ACK response frequency generally needs to be determined based on a size of a file that needs to be transmitted, a capability of the transmit end, network bandwidth, and the like.

After selecting the appropriate first fast recovery ACK response frequency, the first device generates the modification result, where the modification result indicates that the first device has modified the fast recovery ACK response frequency.

Optionally, when the TCP parameter is the normal transmission ACK response frequency, the modifying, by the first device, the TCP parameter, to obtain a modified TCP parameter includes: calling the data transfer protocol modification interface to modify the normal transmission ACK response frequency corresponding to the data stream, to obtain a modified first normal transmission ACK response frequency, where the first normal transmission ACK response frequency is preset; and the generating, by the first device, a modification result of the TCP parameter includes: after obtaining the modified first normal transmission ACK response frequency, generating, by the first device, the modification result, where the modification result indicates that the first device has modified the normal transmission ACK response frequency.

In this embodiment, the normal transmission ACK response frequency may be determined only by the first device without negotiating with a second device. When it is determined, according to at least one of information about the first device, information about the second device, information about a service currently carried in a data stream, or network status information, that the normal transmission ACK response frequency of the TCP needs to be modified, in this case, the TCP parameter is the normal transmission ACK response frequency. The first device (for example, a transmit end) calls the data transfer protocol modification interface to modify the normal transmission ACK response frequency corresponding to the data stream to a more appropriate first normal transmission ACK response frequency, where the first normal transmission ACK response frequency may be preset by the first device. Specifically, the first normal transmission ACK response frequency generally needs to be determined based on a size of a file that needs to be transmitted, a capability of the transmit end, network bandwidth, and the like.

After selecting the appropriate first normal transmission ACK response frequency, the first device generates the modification result, where the modification result indicates that the first device has modified the normal transmission ACK response frequency.

Figure 2:
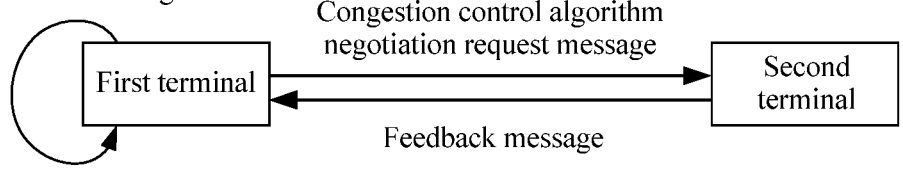
FIG. 2 is a first diagram of an implementation principle of an embodiment of a data transmission method according to the present invention.

FIG. 2 is a first diagram of an implementation principle of an embodiment of a data transmission method according to the present invention.

Figure 3:
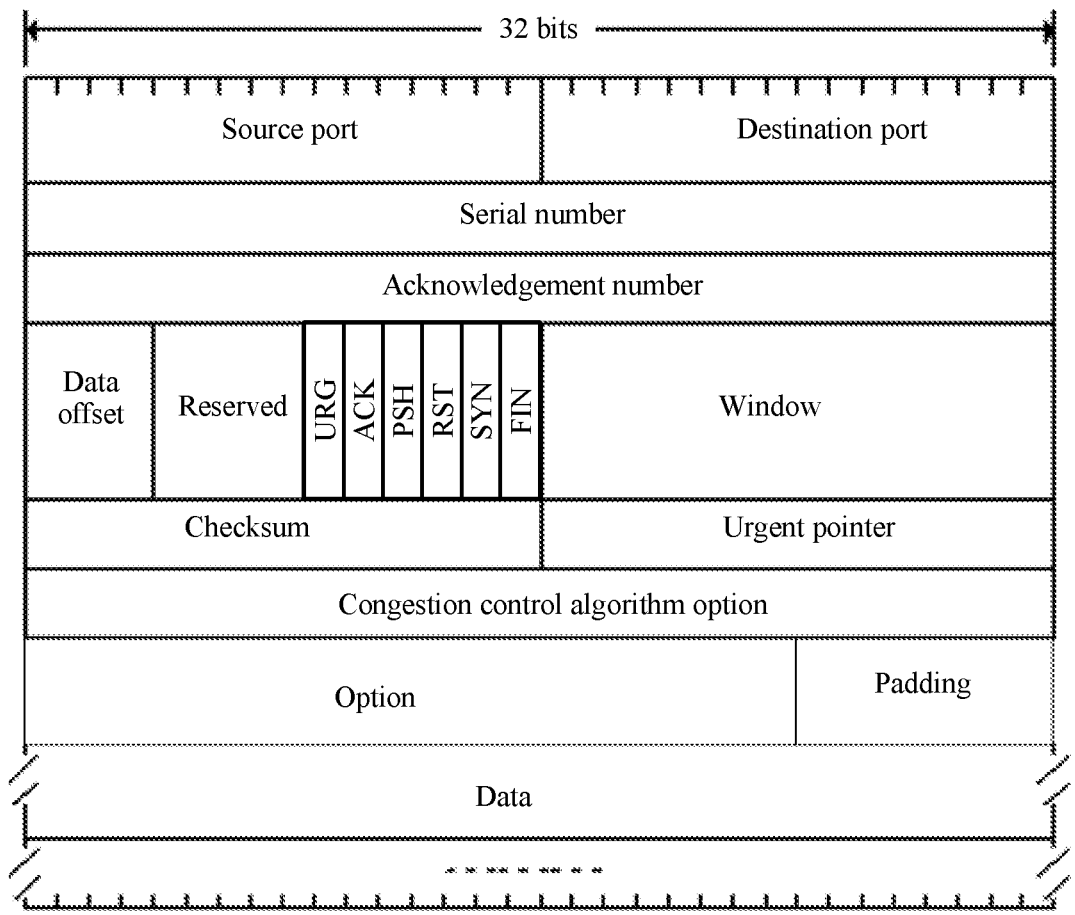
FIG. 3 is a first schematic diagram of a packet format of an embodiment of a data transmission method according to the present invention.

FIG. 3 is a first schematic diagram of a packet format of an embodiment of a data transmission method according to the present invention.

Optionally, when the TCP parameter is the congestion control algorithm, the modifying, by the first device, the TCP parameter, to obtain a modified TCP parameter includes: calling the data transfer protocol modification interface to modify the congestion control algorithm corresponding to the data stream, to obtain a modified first congestion control algorithm, where the first congestion control algorithm is preset; the sending, by the first device, a data transfer protocol negotiation request message to the second device includes: sending, by the first device, a congestion control algorithm negotiation request message to the second device, where the congestion control algorithm negotiation request message includes the first congestion control algorithm, so that the second device determines whether the first congestion control algorithm meets a preset modification condition; and the receiving, by the first device, a feedback message sent by the second device, and generating the modification result of the TCP parameter according to the feedback message includes: receiving, by the first device, the feedback message sent by the second device, where the feedback message includes information indicating whether the first congestion control algorithm meets the preset modification condition of the second device; and if the feedback message indicates that the first congestion control algorithm meets the preset modification condition of the second device, generating, by the first device, a modification result indicating that the first congestion control algorithm is successfully modified; or if the feedback message indicates that the first congestion control algorithm does not meet the preset modification condition of the second device, generating, by the first device, a modification result indicating that the first congestion control algorithm fails to be modified.

Specifically, as shown in FIG. 2, when it is determined, according to at least one of information about the first device, information about the second device, information about a service currently carried in a data stream, or network status information, that the congestion control algorithm needs to be modified, in this case, the to-be-modified content is the congestion control algorithm. The first device (for example, a transmit end) calls the data transfer protocol modification interface to modify the congestion control algorithm corresponding to the data stream to a more appropriate first congestion control algorithm, where the first congestion control algorithm may be selected from multiple preset congestion control algorithms by the first device.

There are multiple congestion control algorithms for different networks including low-speed networks such as a satellite network and a dial-up access network, and the current high-speed Internet, and for different services including a small object involved in a search engine and a large object involved in file downloading. The congestion control algorithms specifically include Selective Acknowledgement (SACK), BIC, CUBIC, compound TCP, High Speed Transmission Control Protocol (HSTCP), eXplicit Control Protocol (XCP), and the like.

After selecting the appropriate first congestion control algorithm, the first device sends the congestion control algorithm negotiation request message to the second device, where the congestion control algorithm negotiation request message is a message including the first congestion control algorithm, so that the second device determines whether the first congestion control algorithm meets the preset modification condition, that is, whether the second device supports the first congestion control algorithm; and in this case, the data transfer protocol negotiation request message is specifically the congestion control algorithm negotiation request message.

The first device receives the feedback message sent by the second device, where the feedback message includes information indicating whether the first congestion control algorithm meets the preset modification condition of the second device; and if the feedback message indicates that the first congestion control algorithm meets the preset modification condition of the second device, the first device generates a modification result indicating that the first congestion control algorithm is successfully modified; or if the feedback message indicates that the first congestion control algorithm does not meet the preset modification condition of the second device, the first device generates a modification result indicating that the first congestion control algorithm fails to be modified.

In FIG. 2, the transmit end modifies the congestion control algorithm. A developer may modify the congestion control algorithm at a receive end, and then the receive end may negotiate with the transmit end to notify the developer whether the congestion control algorithm is successfully modified.

Specific packet formats of the congestion control algorithm negotiation request message and the feedback message may be the packet format shown in FIG. 3. A congestion control algorithm option is added to a TCP packet. Certainly, the congestion control algorithm option may be used as formal content in the TCP packet. That is, the congestion control algorithm option may be used as a fixed field to indicate the congestion control algorithm. Content of the congestion control algorithm option is shown in the following Table 1.

TABLE 1

| Congestion control algorithm option | Length | Value |
| --- | --- | --- |
| Congestion control algorithm negotiation request message | 32 bits | xx |
| Feedback message | xx | xx |

In the foregoing Table 1, a value "xx" of the congestion control algorithm negotiation request message may be one of the congestion control algorithms listed above, for example, the XCP, or another congestion control algorithm, and a length may not be 32 bits. This is not limited in the present invention.

A length and a value of the feedback message may also be determined according to an actual requirement.

Figure 4:
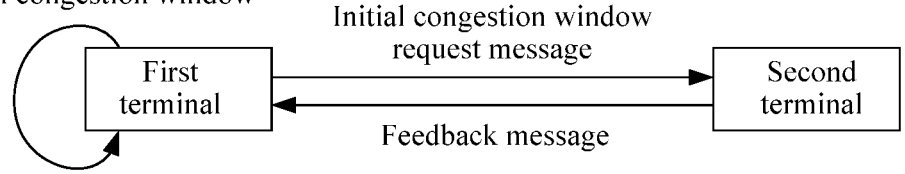
FIG. 4 is a second diagram of an implementation principle of an embodiment of a data transmission method according to the present invention.

FIG. 4 is a second diagram of an implementation principle of an embodiment of a data transmission method according to the present invention.

Figure 5:
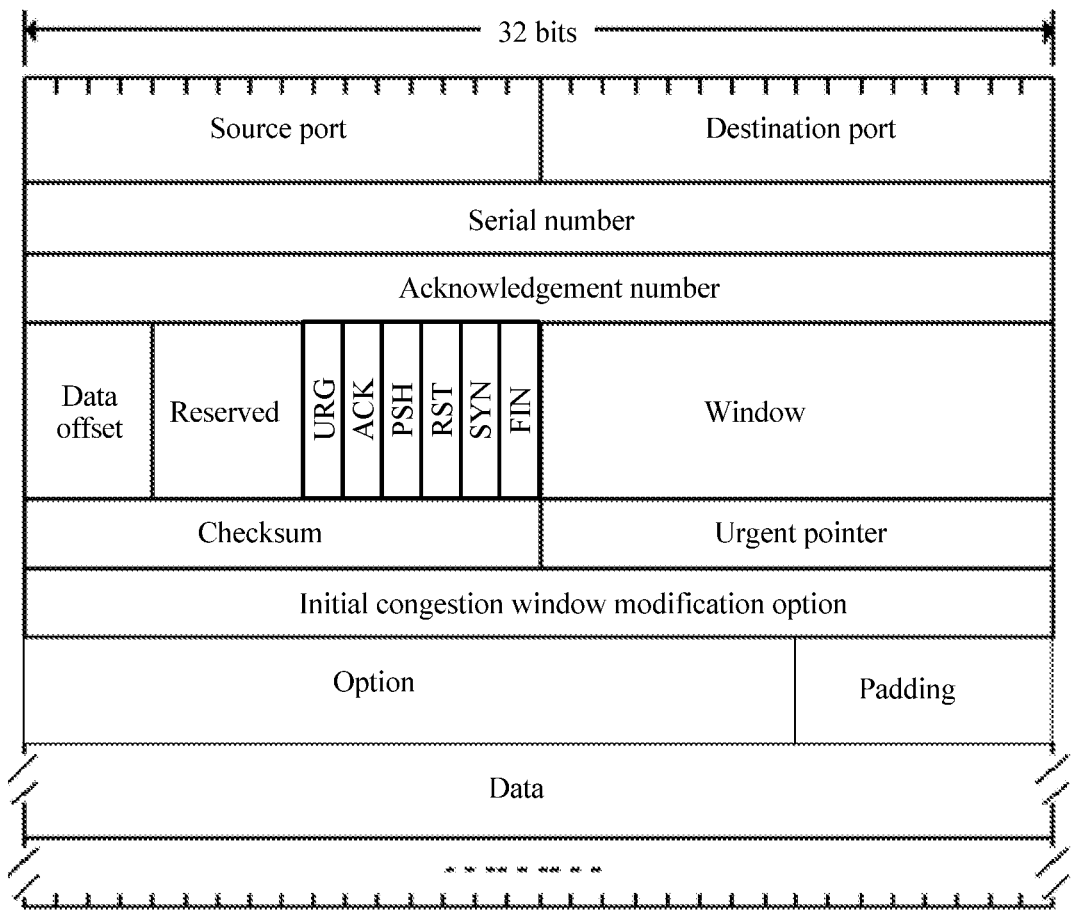
FIG. 5 is a second schematic diagram of a packet format of an embodiment of a data transmission method according to the present invention.

FIG. 5 is a second schematic diagram of a packet format of an embodiment of a data transmission method according to the present invention.

Optionally, when the TCP parameter is the initial congestion window and the receive window, the modifying, by the first device, the TCP parameter, to obtain a modified TCP parameter includes: calling the data transfer protocol modification interface to modify the initial congestion window corresponding to the data stream, to obtain a modified first initial congestion window, where the first initial congestion window is preset; the sending, by the first device, a data transfer protocol negotiation request message to the second device includes: sending, by the first device, an initial congestion window request message to the second device, where the initial congestion window request message includes the first initial congestion window, so that the second device determines whether modifying the receive window corresponding to the first initial congestion window to a first receive window meets a preset modification condition; and the receiving, by the first device, a feedback message sent by the second device, and generating the modification result of the TCP parameter according to the feedback message includes: receiving, by the first device, the feedback message sent by the second device, where the feedback message includes information indicating whether the first receive window meets the preset modification condition of the second device; and if the feedback message indicates that the first receive window meets the preset modification condition of the second device, generating, by the first device, a modification result indicating that the first initial congestion window and the first receive window are successfully modified; or if the feedback message indicates that the first receive window does not meet the preset modification condition of the second device, generating, by the first device, a modification result indicating that the first initial congestion window and the first receive window fail to be modified.

Specifically, slow start is a congestion control mechanism used in the TCP, and the slow start is also referred to as an exponential increase period. To avoid congestion, in the slow start, a congestion window (Cwnd) is added to the TCP of a sender. The slow start indicates that the congestion window of a transmit end of the TCP increases each time an acknowledgement is received. An increased size of the window is a quantity of acknowledged packet segments. This situation lasts until some segments are not received or a size of the window reaches a predefined threshold. If a loss event occurs, it is considered that network congestion occurs in the TCP, and a measure is used to reduce the network congestion. Once the loss event occurs or the threshold is reached, a linear increase phase is entered in the TCP. In this case, the window increases by one packet segment after each period of a round trip time (RTT).

For example, when a TCP connection to a host in another network is established, the congestion window may be initialized to one packet segment (that is, a size of the packet segment advertised by another end), that is, the initial congestion window is one packet segment. Each time one ACK is received, the congestion window increases by one packet segment (the Cwnd is measured in bytes, but in slow start, the congestion window increases by a size of a packet segment). The transmit end selects a smaller value in the congestion window and the receive window (Rwnd) as a sending upper limit. The congestion window is a traffic control measure used by the sender, and the receive window is a traffic control measure used by a receive end. The initial congestion window may be further modified according to an actual situation.

As shown in FIG. 4, when it is determined, according to at least one of information about the first device, information about the second device, information about a service currently carried in a data stream, or network status information, that the initial congestion window of the TCP needs to be modified, in this case, the TCP parameter is the initial congestion window and the receive window. The first device (for example, the transmit end) calls the data transfer protocol modification interface to modify the initial congestion window corresponding to the data stream to a more appropriate first initial congestion window, where the first initial congestion window may be preset by the first device. Specifically, the first initial congestion window generally needs to be determined based on a size of a file that needs to be transmitted, a capability of the transmit end, network bandwidth, and the like.

After selecting the appropriate first initial congestion window, the first device sends the initial congestion window request message to the second device (for example, the receive end), where the initial congestion window request message includes the first initial congestion window, so that the second device determines whether modifying the receive window corresponding to the first initial congestion window to the first receive window meets the preset modification condition. The first initial congestion window may be preset by the first device. The first receive window is corresponding to the first initial congestion window, a size of the first receive window may be the same as or may be different from a size of the first initial congestion window, and the sizes may be set to be the same for small files. In this case, the data transfer protocol negotiation request message is specifically a receive window negotiation request message.

The first device receives the feedback message sent by the second device, where the feedback message includes information indicating whether the first receive window meets the preset modification condition of the second device; and if the feedback message indicates that the first receive window meets the preset modification condition of the second device, the first device generates a modification result indicating that the first initial congestion window and the first receive window are successfully modified; or if the feedback message indicates that the first receive window does not meet the preset modification condition of the second device, the first device generates a modification result indicating that the first initial congestion window and the first receive window fail to be modified.

Specific packet formats of the receive window negotiation request message and the feedback message may be the packet format shown in FIG. 5. An initial congestion window modification option is added to a TCP packet. Certainly, the initial congestion window modification option may be used as formal content in the TCP packet. That is, the initial congestion window modification option may be used as a fixed field to indicate the initial congestion window. Content of the initial congestion window modification option is shown in the following Table 2.

TABLE 2

| Receive window modification option | Length | Value |
| --- | --- | --- |
| Initial congestion window request message | 32 bits | xx |
| Feedback message | 32 bits | xx |

In the foregoing Table 2, a value "xx" of the initial congestion window request message may be an initial congestion window that is of any length and that is actually required, and a length of the message may not be 32 bits. This is not limited in the present invention.

A length and a value of the feedback message may also be determined according to an actual requirement.

Figure 6:
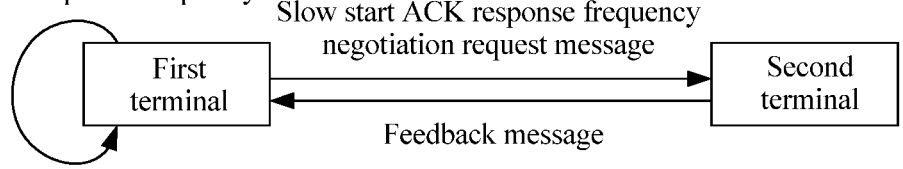
FIG. 6 is a third diagram of an implementation principle of an embodiment of a data transmission method according to the present invention.

FIG. 6 is a third diagram of an implementation principle of an embodiment of a data transmission method according to the present invention.

Figure 7:
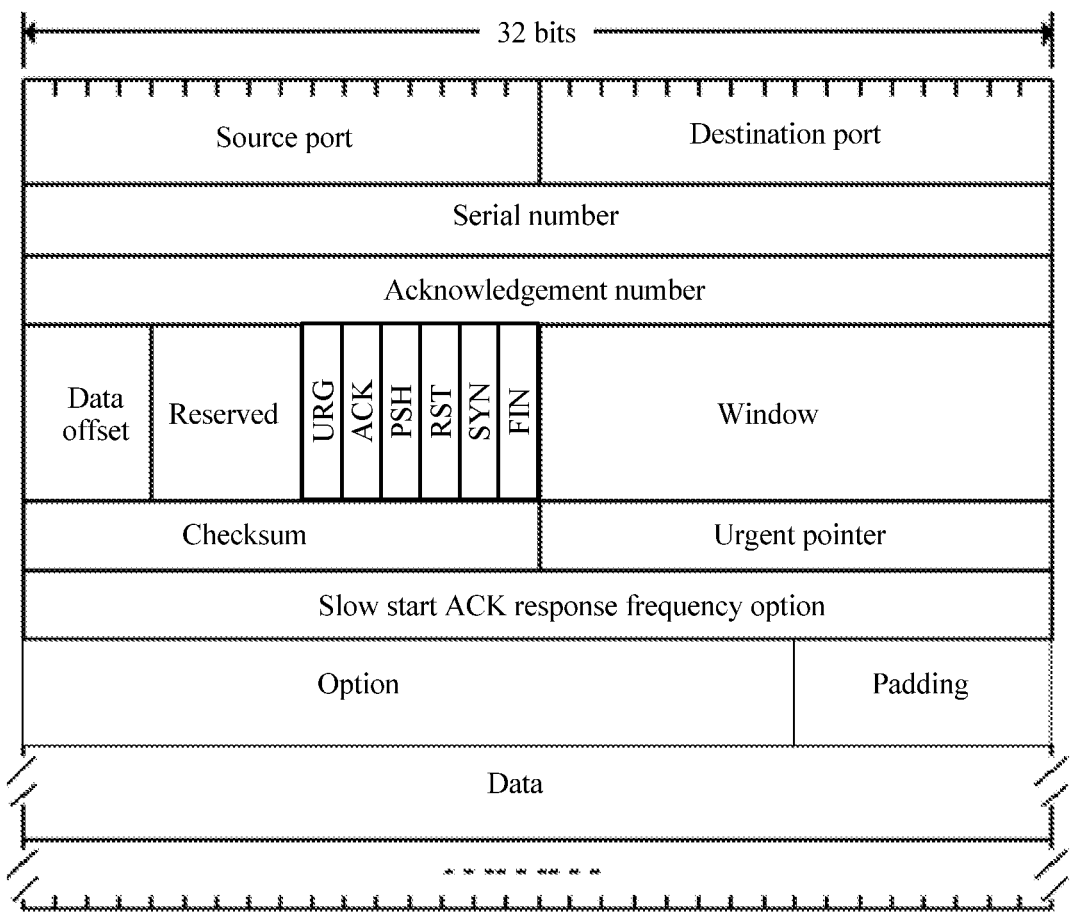
FIG. 7 is a third schematic diagram of a packet format of an embodiment of a data transmission method according to the present invention.

FIG. 7 is a third schematic diagram of a packet format of an embodiment of a data transmission method according to the present invention.

Optionally, when the TCP parameter is the slow start ACK response frequency, the modifying, by the first device, the TCP parameter, to obtain a modified TCP parameter includes: calling the data transfer protocol modification interface to modify the slow start ACK response frequency corresponding to the data stream, to obtain a modified first slow start ACK response frequency, where the first slow start ACK response frequency is preset; the sending, by the first device, a data transfer protocol negotiation request message to the second device includes: sending, by the first device, a slow start ACK response frequency negotiation request message to the second device, where the slow start ACK response frequency negotiation request message includes the first slow start ACK response frequency, so that the second device determines whether the first slow start ACK response frequency meets a preset modification condition; and the receiving, by the first device, a feedback message sent by the second device, and generating the modification result of the TCP parameter according to the feedback message includes: receiving, by the first device, the feedback message sent by the second device, where the feedback message includes information indicating whether the first slow start ACK response frequency meets the preset modification condition of the second device; and if the feedback message indicates that the first slow start ACK response frequency meets the preset modification condition of the second device, generating, by the first device, a modification result indicating that the first slow start ACK response frequency is successfully modified; or if the feedback message indicates that the first slow start ACK response frequency does not meet the preset modification condition of the second device, generating, by the first device, a modification result indicating that the first slow start ACK response frequency fails to be modified.

Specifically, during slow start, for example, at the beginning, a sender starts sending a packet segment, and then waits for an ACK. When the ACK is received, a congestion window increases from 1 to 2, that is, two packet segments may be sent. When ACKs for the two packet segments are received, the congestion window increases to 4. This is an exponential increase relationship. An increase of the congestion window depends on an ACK response frequency. Currently, each time two packets are received, a receive end sends one ACK. When the ACK is lost or a small quantity of packets are received, the congestion window slowly increases; consequently, duration of the slow start increases. Therefore, the duration of the slow start may be reduced by modifying the ACK response frequency.

As shown in FIG. 6, when the first device (for example, a transmit end) determines that the slow start ACK response frequency of the TCP needs to be modified, in this case, the TCP parameter is the slow start ACK response frequency. The first device calls the data transfer protocol modification interface to modify the slow start ACK response frequency corresponding to the data stream corresponding to the first device to a slow start ACK response frequency that is appropriate for a current service, that is, the first slow start ACK response frequency, where the first slow start ACK response frequency is preset. Specifically, the slow start ACK response frequency is generally determined based on a size of a file that needs to be transmitted, a capability of a server at the transmit end, network bandwidth, and the like.

The first device sends the slow start ACK response frequency negotiation request message to the second device (for example, the receive end), where the slow start ACK response frequency negotiation request message includes the first slow start ACK response frequency, so that the second device determines whether the first slow start ACK response frequency meets the preset modification condition; and in this case, the data transfer protocol negotiation request message is specifically the slow start ACK response frequency negotiation request message.

The first device receives the feedback message sent by the second device, where the feedback message includes information indicating whether the first slow start ACK response frequency meets the preset modification condition of the second device; and if the feedback message indicates that the first slow start ACK response frequency meets the preset modification condition of the second device, the first device generates a modification result indicating that the first slow start ACK response frequency is successfully modified; or if the feedback message indicates that the first slow start ACK response frequency does not meet the preset modification condition of the second device, the first device generates a modification result indicating that the first slow start ACK response frequency fails to be modified.

Specific packet formats of the slow start ACK response frequency negotiation request message and the feedback message may be the packet format shown in FIG. 7. A slow start ACK response frequency option is added to a TCP packet. Certainly, the slow start ACK response frequency option may be used as formal content in the TCP packet. That is, the slow start ACK response frequency option may be used as a fixed field to indicate the slow start ACK response frequency. Content of the slow start ACK response frequency option is shown in the following Table 3.

TABLE 3

| Slow start ACK response frequency option | Length | Value |
| --- | --- | --- |
| Slow start ACK response frequency negotiation request message | xx | xx |
| Feedback message | xx | xx |

In the foregoing Table 3, a value "xx" of the slow start ACK response frequency negotiation request message may be any ACK response frequency that is actually required, and a length of the message may be determined according to an actual requirement, for example, 32 bits. This is not limited in the present invention.

A length and a value of the feedback message may also be determined according to an actual requirement.

Optionally, when the TCP parameter is the congestion avoidance ACK response frequency, the modifying, by the first device, the TCP parameter, to obtain a modified TCP parameter includes: calling the data transfer protocol modification interface to modify the congestion avoidance ACK response frequency corresponding to the data stream, to obtain a modified first congestion avoidance ACK response frequency, where the first congestion avoidance ACK response frequency is preset; the sending, by the first device, a data transfer protocol negotiation request message to the second device includes: sending, by the first device, a congestion avoidance ACK response frequency negotiation request message to the second device, where the congestion avoidance ACK response frequency negotiation request message includes the first congestion avoidance ACK response frequency, so that the second device determines whether the first congestion avoidance ACK response frequency meets a preset modification condition; and the receiving, by the first device, a feedback message sent by the second device, and generating the modification result of the TCP parameter according to the feedback message includes: receiving, by the first device, the feedback message sent by the second device, where the feedback message includes information indicating whether the first congestion avoidance ACK response frequency meets the preset modification condition of the second device; and if the feedback message indicates that the first congestion avoidance ACK response frequency meets the preset modification condition of the second device, generating, by the first device, a modification result indicating that the first congestion avoidance ACK response frequency is successfully modified; or if the feedback message indicates that the first congestion avoidance ACK response frequency does not meet the preset modification condition of the second device, generating, by the first device, a modification result indicating that the first congestion avoidance ACK response frequency fails to be modified.

Specifically, it may be learned from slow start that a Cwnd may fast increase, so as to maximize use of a network bandwidth resource. However, the Cwnd cannot infinitely increase, and a specific limit is required. A variable referred to as a slow start threshold (SSThresh) is used in the TCP. When the Cwnd exceeds the value, a process of the slow start ends and a congestion avoidance phase is entered. For most implementations of the TCP, the value of the SSThresh is 65536 (it is also measured in bytes). A main idea of congestion avoidance is to increase Cwnd at a step of 1, that is, a value of the Cwnd no longer exponentially increases. In this case, when all packet segments in the window are acknowledged, a value of the CWnd increases by 1, the value of the Cwnd linearly increases with an RTT. This prevents network congestion caused when the Cwnd increases excessively fast, and an optimal value of the Cwnd in a network is obtained by increasing the Cwnd slowly.

A speed of increasing the congestion window may be controlled by adjusting the congestion avoidance ACK response frequency during the congestion avoidance.

In this embodiment, when the first device (for example, a transmit end) determines, according to at least one of information about the first device, information about the second device, information about a service currently carried in a data stream, or network status information, that the congestion avoidance ACK response frequency of the TCP needs to be modified, in this case, the TCP parameter is the congestion avoidance ACK response frequency. The first device calls the data transfer protocol modification interface to modify the congestion avoidance ACK response frequency corresponding to the data stream to a congestion avoidance ACK response frequency that is appropriate for a current service, that is, the first congestion avoidance ACK response frequency, where the first congestion avoidance ACK response frequency is preset. Specifically, the congestion avoidance ACK response frequency is generally determined based on a size of a file that needs to be transmitted, a capability of the transmit end, network bandwidth, and the like.

The first device sends the congestion avoidance ACK response frequency negotiation request message to the second device (for example, a receive end), where the congestion avoidance ACK response frequency negotiation request message includes the first congestion avoidance ACK response frequency, so that the second device determines whether the first congestion avoidance ACK response frequency meets the preset modification condition; and in this case, the data transfer protocol negotiation request message is specifically the congestion avoidance ACK response frequency negotiation request message.

The first device receives the feedback message sent by the second device, where the feedback message includes information indicating whether the first congestion avoidance ACK response frequency meets the preset modification condition; and if the feedback message indicates that the first congestion avoidance ACK response frequency meets the preset modification condition, the first device generates a modification result indicating that the first congestion avoidance ACK response frequency is successfully modified; or if the feedback message indicates that the first congestion avoidance ACK response frequency does not meet the preset modification condition, the first device generates a modification result indicating that the first congestion avoidance ACK response frequency fails to be modified.

Specific packet formats of the congestion avoidance ACK response frequency negotiation request message and the feedback message are similar to those of the slow start ACK response frequency negotiation request message and the feedback message. Details are not described herein again.

Optionally, when the TCP parameter is the fast recovery ACK response frequency, the modifying, by the first device, the TCP parameter, to obtain a modified TCP parameter includes: calling the data transfer protocol modification interface to modify the fast recovery ACK response frequency corresponding to the data stream, to obtain a modified first fast recovery ACK response frequency, where the first fast recovery ACK response frequency is preset; the sending, by the first device, a data transfer protocol negotiation request message to the second device includes: sending, by the first device, a fast recovery ACK response frequency negotiation request message to the second device, where the fast recovery ACK response frequency negotiation request message includes the first fast recovery ACK response frequency, so that the second device determines whether the first fast recovery ACK response frequency meets a preset modification condition; and the receiving, by the first device, a feedback message sent by the second device, and generating the modification result of the TCP parameter according to the feedback message includes: receiving, by the first device, the feedback message sent by the second device, where the feedback message includes information indicating whether the first fast recovery ACK response frequency meets the preset modification condition of the second device; and if the feedback message indicates that the first fast recovery ACK response frequency meets the preset modification condition of the second device, generating, by the first device, a modification result indicating that the first fast recovery ACK response frequency is successfully modified; or if the feedback message indicates that the first fast recovery ACK response frequency does not meet the preset modification condition of the second device, generating, by the first device, a modification result indicating that the first fast recovery ACK response frequency fails to be modified.

Specifically, there is fast retransmission in the TCP, that is, when three identical ACKs are received. The three identical ACKs in the TCP are used to determine a packet loss. In this case, the fast retransmission is performed. During the fast retransmission, an SSThresh and a size of a congestion window are reset, and a congestion avoidance phase is reentered. A fast recovery algorithm is added on the basis of the foregoing fast retransmission algorithm. When the three duplicate ACKs are received, in this case, in the TCP, a fast recovery phase instead of a congestion avoidance phase is finally entered. Generally, the fast retransmission and fast recovery algorithms are used at the same time. An idea of fast recovery is a principle of "packet conservation", that is, a quantity of packets in a network at a same moment is constant. A "new" packet can be sent to the network only after an "old" packet leaves the network. If a sender receives a duplicate ACK, it indicates, according to an ACK mechanism of the TCP, that a packet leaves the network, and then the Cwnd increases by 1. If the principle can be strictly followed, network congestion rarely occurs.

During the fast recovery, the SSThresh and the size of the congestion window are also reset. After a process of the recovery ends, the congestion avoidance state is reentered.

In the process of the fast recovery, a speed of increasing the congestion window may be controlled by adjusting the fast recovery ACK response frequency.

In this embodiment, when the first device (for example, a transmit end) determines, according to at least one of information about the first device, information about the second device, information about a service currently carried in a data stream, or network status information, that the fast recovery ACK response frequency of the TCP needs to be modified, in this case, the TCP parameter is the fast recovery ACK response frequency. The first device calls the data transfer protocol modification interface to modify the fast recovery ACK response frequency corresponding to the data stream to a fast recovery ACK response frequency that is appropriate for a current service, that is, the first fast recovery ACK response frequency, where the first fast recovery ACK response frequency is preset. Specifically, the fast recovery ACK response frequency is generally determined based on a size of a file that needs to be transmitted, a capability of the transmit end, network bandwidth, and the like.

The first device sends the fast recovery ACK response frequency negotiation request message to the second device (for example, a receive end), where the fast recovery ACK response frequency negotiation request message includes the first fast recovery ACK response frequency, so that the second device determines whether the first fast recovery ACK response frequency meets the preset modification condition; and in this case, the data transfer protocol negotiation request message is specifically the fast recovery ACK response frequency negotiation request message.

The first device receives the feedback message sent by the second device, where the feedback message includes information indicating whether the first fast recovery ACK response frequency meets the preset modification condition; and if the feedback message indicates that the first fast recovery ACK response frequency meets the preset modification condition, the first device generates a modification result indicating that the first fast recovery ACK response frequency is successfully modified; or if the feedback message indicates that the first fast recovery ACK response frequency does not meet the preset modification condition, the first device generates a modification result indicating that the first fast recovery ACK response frequency fails to be modified.

Specific packet formats of the fast recovery ACK response frequency negotiation request message and the feedback message are similar to those of the slow start ACK response frequency negotiation request message and the feedback message. Details are not described herein again.

Optionally, when the TCP parameter is the normal transmission ACK response frequency, the modifying, by the first device, the TCP parameter, to obtain a modified TCP parameter includes: calling the data transfer protocol modification interface to modify the normal transmission ACK response frequency corresponding to the data stream, to obtain a modified first normal transmission ACK response frequency, where the first normal transmission ACK response frequency is preset; the sending, by the first device, a data transfer protocol negotiation request message to the second device includes: sending, by the first device, a normal transmission ACK response frequency negotiation request message to the second device, where the normal transmission ACK response frequency negotiation request message includes the first normal transmission ACK response frequency, so that the second device determines whether the first normal transmission ACK response frequency meets a preset modification condition; and the receiving, by the first device, a feedback message sent by the second device, and generating the modification result of the TCP parameter according to the feedback message includes: receiving, by the first device, the feedback message sent by the second device, where the feedback message includes information indicating whether the first normal transmission ACK response frequency meets the preset modification condition of the second device; and if the feedback message indicates that the first normal transmission ACK response frequency meets the preset modification condition of the second device, generating, by the first device, a modification result indicating that the first normal transmission ACK response frequency is successfully modified; or if the feedback message indicates that the first normal transmission ACK response frequency does not meet the preset modification condition of the second device, generating, by the first device, a modification result indicating that the first normal transmission ACK response frequency fails to be modified.

Specifically, a variable-size sliding window (that is, a transmit window) is used in the TCP to control traffic, and a size of the window is measured in bytes.

During establishment of a connection, the transmit window is negotiated by a transmit end and a receive end, and is determined based on both the congestion window and the receive window. An upper limit of the transmit window=Min[Rwnd, Cwnd]. When Rwnd<Cwnd, a maximum value of the transmit window is limited by a receiving capability of the receive end. When Cwnd<Rwnd, a maximum value of the transmit window is limited by network congestion.

If the transmit window is 500 bytes, and a transmit end has sent data of 400 bytes, only an acknowledgement for data of the first 200 bytes is received, and the size of the window remains unchanged. Because the transmit window is 500 bytes, data of 300 bytes may be further sent.

If the transmit end receives an acknowledgement for data of the first 400 bytes from the receive end, the receive end notifies the transmit end that the receive window is reduced to 400 bytes. Currently, the transmit end may further send data of a maximum of 400 bytes.

The normal transmission ACK response frequency is adjusted, that is, a frequency at which the receive end sends an ACK is adjusted. Generally, each time two packets are received, the receive end responds with one ACK. Certainly, the frequency may be modified so that the receive end responds with one ACK each time one packet is received, or an ACK response frequency may be reduced during transmission of a large amount of data, so that a size of the transmit window can be adjusted.

When the first device (for example, the transmit end) determines, according to at least one of information about the first device, information about the second device, information about a service currently carried in a data stream, or network status information, that the normal transmission ACK response frequency of the TCP needs to be modified, in this case, the TCP parameter is the normal transmission ACK response frequency. The first device calls the data transfer protocol modification interface to modify the normal transmission ACK response frequency corresponding to the data stream to a normal transmission ACK response frequency that is appropriate for a current service, that is, the first normal transmission ACK response frequency, where the first normal transmission ACK response frequency is preset. Specifically, the normal transmission ACK response frequency is generally determined based on a size of a file that needs to be transmitted, a capability of a server at the transmit end, network bandwidth, and the like.

The first device sends the normal transmission ACK response frequency negotiation request message to the second device (for example, the receive end), where the normal transmission ACK response frequency negotiation request message includes the first normal transmission ACK response frequency, so that the second device determines whether the first normal transmission ACK response frequency meets the preset modification condition; and in this case, the data transfer protocol negotiation request message is specifically the normal transmission ACK response frequency negotiation request message.

The first device receives the feedback message sent by the second device, where the feedback message includes information indicating whether the first normal transmission ACK response frequency meets the preset modification condition; and if the feedback message indicates that the first normal transmission ACK response frequency meets the preset modification condition, the first device generates a modification result indicating that the first normal transmission ACK response frequency is successfully modified; or if the feedback message indicates that the first normal transmission ACK response frequency does not meet the preset modification condition, the first device generates a modification result indicating that the first normal transmission ACK response frequency fails to be modified.

Specific packet formats of the normal transmission ACK response frequency negotiation request message and the feedback message are similar to those of the slow start ACK response frequency negotiation request message and the feedback message. Details are not described herein again.

Figure 8:
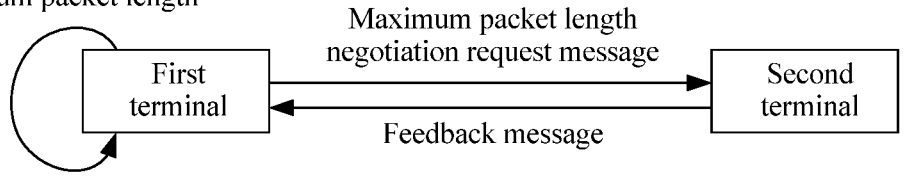
FIG. 8 is a fourth diagram of an implementation principle of an embodiment of a data transmission method according to the present invention.

FIG. 8 is a fourth diagram of an implementation principle of an embodiment of a data transmission method according to the present invention.

Figure 9:
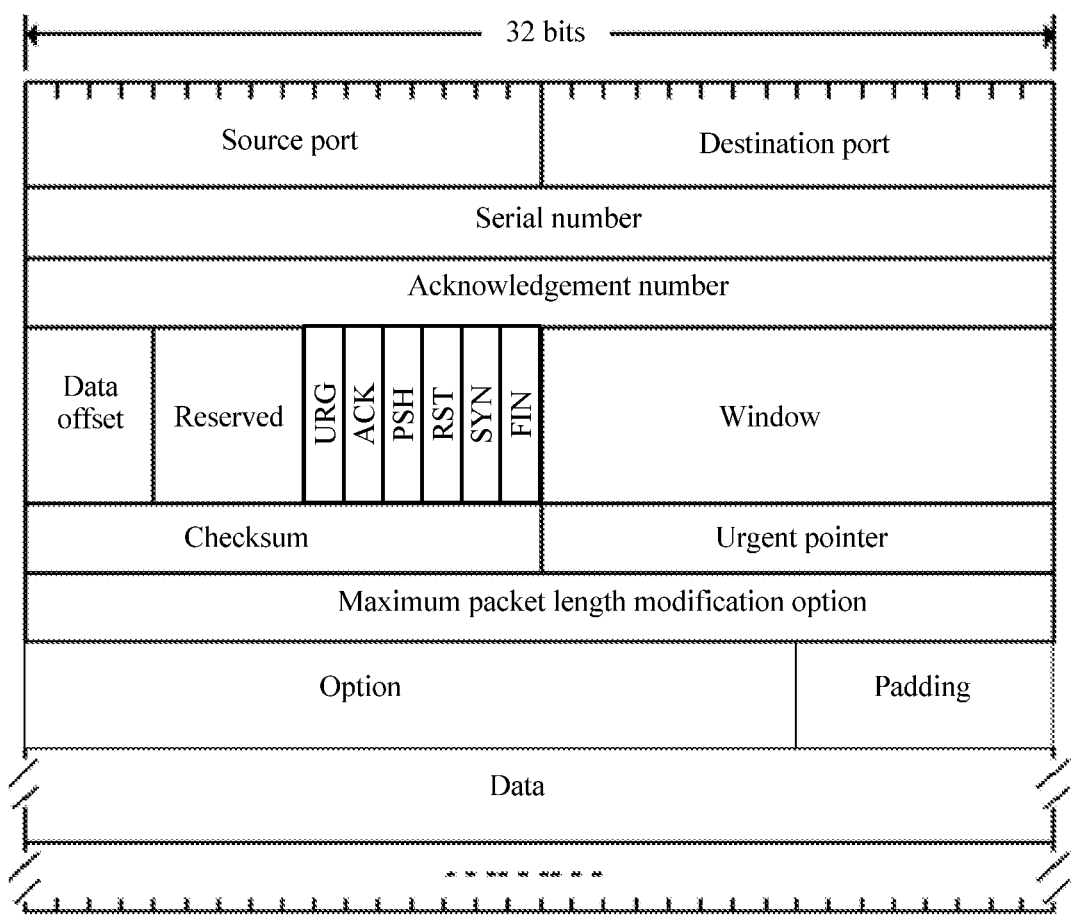
FIG. 9 is a fourth schematic diagram of a packet format of an embodiment of a data transmission method according to the present invention.

FIG. 9 is a fourth schematic diagram of a packet format of an embodiment of a data transmission method according to the present invention.

Optionally, when the TCP parameter is the maximum packet length, the modifying, by the first device, the TCP parameter, to obtain a modified TCP parameter includes: calling the data transfer protocol modification interface to modify the maximum packet length corresponding to the data stream, to obtain a modified first maximum packet length, where the first maximum packet length is preset; the sending, by the first device, a data transfer protocol negotiation request message to the second device includes: sending, by the first device, a maximum packet length negotiation request message to the second device, where the maximum packet length negotiation request message includes the first maximum packet length, so that the second device determines whether the first maximum packet length meets a preset modification condition; and the receiving, by the first device, a feedback message sent by the second device, and generating the modification result of the TCP parameter according to the feedback message includes: receiving, by the first device, the feedback message sent by the second device, where the feedback message includes information indicating whether the first maximum packet length meets the preset modification condition of the second device; and if the feedback message indicates that the first maximum packet length meets the preset modification condition of the second device, generating, by the first device, a modification result indicating that the first maximum packet length is successfully modified; or if the feedback message indicates that the first maximum packet length does not meet the preset modification condition of the second device, generating, by the first device, a modification result indicating that the first maximum packet length fails to be modified.

Specifically, the maximum packet length of a current TCP is strongly related to a maximum transmission unit (MTU) of a link between a transmit end and a receive end. This ignores the MTU of the link in an intermediate network and a service requirement.

The MTU refers to a size of a maximum packet that can be transferred at a specific layer of a communications protocol (in bytes). If the MTU of the transmit end does not match the MTU of the receive end, a packet loss rate increases, and a network speed is reduced.

In this embodiment, as shown in FIG. 8, when the first device (for example, the transmit end) determines, according to at least one of information about the first device, information about the second device, information about a service currently carried in a data stream, or network status information, that the maximum packet length of the TCP needs to be modified, in this case, the TCP parameter is the maximum packet length. The first device calls the data transfer protocol modification interface to modify the maximum packet length corresponding to the data stream to a maximum packet length that is appropriate for a current service, that is, the first maximum packet length, where the first maximum packet length is preset. Specifically, the maximum packet length is generally determined based on capabilities of the transmit end and the receive end, network bandwidth, and the like.

The first device sends the maximum packet length negotiation request message to the second device (for example, the receive end), where the maximum packet length negotiation request message includes the first maximum packet length, so that the second device determines whether the first maximum packet length meets the preset modification condition; and in this case, the data transfer protocol negotiation request message is specifically the maximum packet length negotiation request message.

The first device receives the feedback message sent by the second device, where the feedback message includes information indicating whether the first maximum packet length meets the preset modification condition; and if the feedback message indicates that the first maximum packet length meets the preset modification condition, the first device generates a modification result indicating that the first maximum packet length is successfully modified; or if the feedback message indicates that the first maximum packet length does not meet the preset modification condition, the first device generates a modification result indicating that the first maximum packet length fails to be modified.

Specific packet formats of the maximum packet length negotiation request message and the feedback message may be the packet format shown in FIG. 9. A maximum packet length modification option is added to a TCP packet. Certainly, the maximum packet length modification option may be used as formal content in the TCP packet. That is, the maximum packet length modification option may be used as a fixed field to indicate the maximum packet length. Content of the maximum packet length modification option is shown in the following Table 4.

TABLE 4

| Maximum packet length modification option | Length | Value |
| --- | --- | --- |
| Maximum packet length negotiation request message | xx | xx |
| Feedback message | xx | xx |

In the foregoing Table 4, a value "xx" of the maximum packet length negotiation request message may be any packet length that is actually required, and a length of the message may be determined according to an actual requirement, for example, 32 bits. This is not limited in the present invention.

A length and a value of the feedback message may also be determined according to an actual requirement.

A technical effect of this embodiment is similar to that of the foregoing embodiment, and details are not described herein again.

Figure 10:
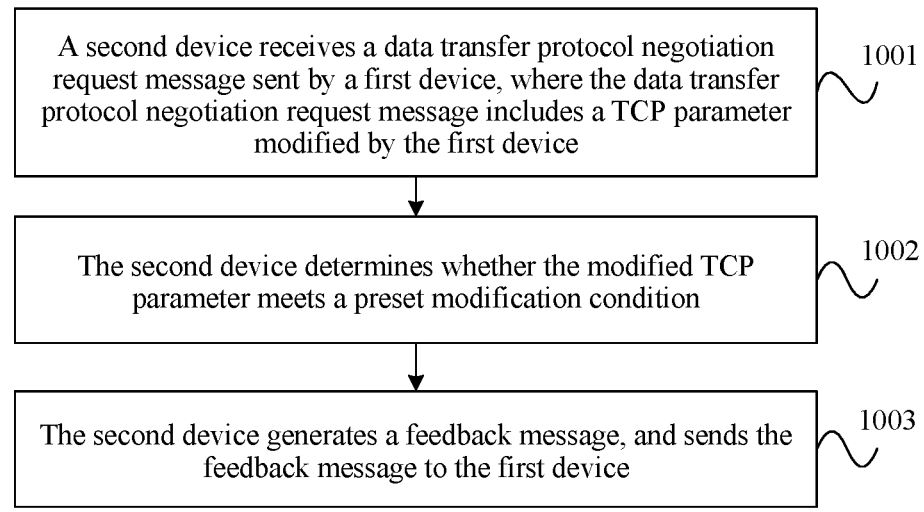
FIG. 10 is a flowchart of another embodiment of a data transmission method according to the present invention.

FIG. 10 is a flowchart of another embodiment of a data transmission method according to the present invention. An execution body of this embodiment is a second device. The second device may be a transmit end or a receive end of the TCP. That is, the second device may be a server or a client device. As shown in FIG. 10, the data transmission method provided in this embodiment includes the following steps.

Step 1001: The second device receives a data transfer protocol negotiation request message sent by a first device, where the data transfer protocol negotiation request message includes a TCP parameter modified by the first device.

Step 1002: The second device determines whether the modified TCP parameter meets a preset modification condition.

Step 1003: The second device generates a feedback message, and sends the feedback message to the first device.

Optionally, the TCP parameter includes any one or more of the following items: an initial congestion window; a congestion window for retransmission after timeout; a congestion window for fast recovery; a slow start threshold; a slow start threshold for retransmission after timeout; a congestion window threshold for fast recovery; a slow start step; a congestion avoidance step; a congestion control algorithm; a receive window; a slow start ACK response frequency; a congestion avoidance ACK response frequency; a fast recovery ACK response frequency; a normal transmission ACK response frequency; or a maximum packet length.

An implementation principle and a technical effect of this embodiment are similar to those of the embodiment shown in FIG. 1, and details are not described herein again.

Figure 11:
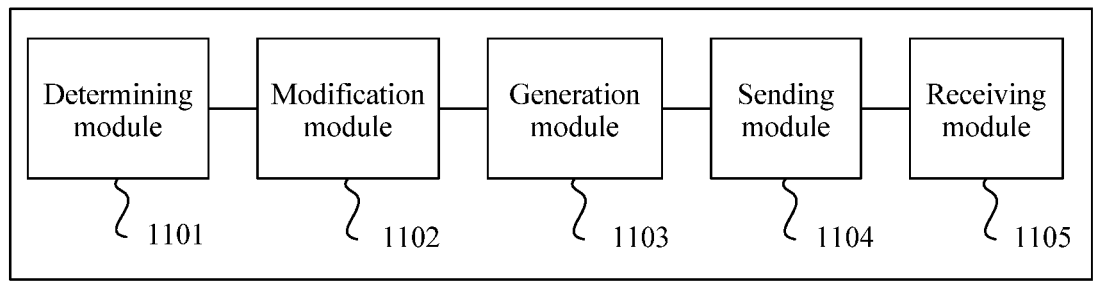
FIG. 11 is a schematic structural diagram of Embodiment 1 of a first device according to the present invention.

FIG. 11 is a schematic structural diagram of Embodiment 1 of a first device according to the present invention. As shown in FIG. 11, the first device in this embodiment may include a determining module 1101, a modification module 1102, and a generation module 1103. The determining module 1101 is configured to determine, according to data stream information, whether a data transfer protocol TCP parameter in a data stream corresponding to the data stream information needs to be modified, where the data stream information includes at least one of the following information: information about the first device, information about a second device, service information, or network status information.

The modification module 1102 is configured to: if the determining module determines that the TCP parameter needs to be modified, modify the TCP parameter, to obtain a modified TCP parameter.

The generation module 1103 is configured to generate a modification result of the TCP parameter.

Optionally, the first device further includes: a sending module 1104, configured to send a data transfer protocol negotiation request message to the second device, where the data transfer protocol negotiation request message includes the modified TCP parameter; and the data transfer protocol negotiation request message is used to request the second device to determine whether the modified TCP parameter meets a preset modification condition; and a receiving module 1105, configured to receive a feedback message sent by the second device, where the generation module 1103 is specifically configured to: generate the modification result of the TCP parameter according to the feedback message.

Optionally, the data transfer protocol negotiation request message is a data transfer protocol packet; and the modified TCP parameter is used as an option in the data transfer protocol packet.

Optionally, the modification module 1102 is specifically configured to: generate a first socket corresponding to the data stream; and modify the TCP parameter by using a data transfer protocol modification interface corresponding to the first socket, to obtain the modified TCP parameter.

Optionally, the data transfer protocol modification interface includes: a general socket programming interface and a new application programming interface API.

Optionally, the TCP parameter includes any one or more of the following items: an initial congestion window; a congestion window for retransmission after timeout; a congestion window for fast recovery; a slow start threshold; a slow start threshold for retransmission after timeout; a congestion window threshold for fast recovery; a slow start step; a congestion avoidance step; a congestion control algorithm; a receive window; a slow start ACK response frequency; a congestion avoidance ACK response frequency; a fast recovery ACK response frequency; a normal transmission ACK response frequency; or a maximum packet length.

In this embodiment, the first device may be configured to perform the technical solution in the method embodiment shown in FIG. 1. An implementation principle and a technical effect of the first device are similar to those of the embodiment shown in FIG. 1, and details are not described herein again.

Figure 12:
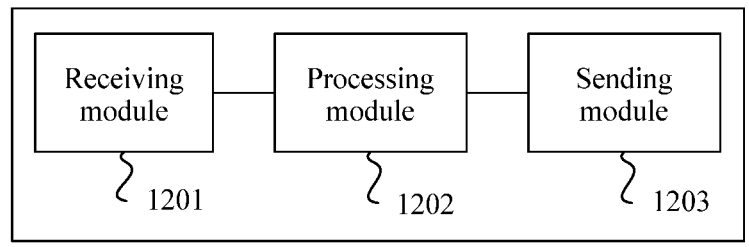
FIG. 12 is a schematic structural diagram of Embodiment 1 of a second device according to the present invention.

FIG. 12 is a schematic structural diagram of Embodiment 1 of a second device according to the present invention. As shown in FIG. 12, the second device in this embodiment may include a receiving module 1201, a processing module 1202, and a sending module 1203. The receiving module 1201 is configured to receive a data transfer protocol negotiation request message sent by a first device, where the data transfer protocol negotiation request message includes a TCP parameter modified by the first device; the processing module 1202 is configured to determine whether the modified TCP parameter meets a preset modification condition; and the sending module 1203 is configured to generate a feedback message, and send the feedback message to the first device.

Optionally, the sending module 1203 may be further configured to send in advance information about the second device to the first device, so that the first device determines, according to data stream information, whether a data transfer protocol TCP parameter in a data stream corresponding to the data stream information needs to be modified.

Optionally, the TCP parameter includes any one or more of the following items: an initial congestion window; a congestion window for retransmission after timeout; a congestion window for fast recovery; a slow start threshold; a slow start threshold for retransmission after timeout; a congestion window threshold for fast recovery; a slow start step; a congestion avoidance step; a congestion control algorithm; a receive window; a slow start ACK response frequency; a congestion avoidance ACK response frequency; a fast recovery ACK response frequency; a normal transmission ACK response frequency; or a maximum packet length.

In this embodiment, the second device may be configured to perform the technical solution in the method embodiment shown in FIG. 10. An implementation principle and a technical effect of the second device are similar to those of the embodiment shown in FIG. 10, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
    determining, by a first device and according to data stream information, whether a Transmission Control Protocol (TCP) parameter associated with a data stream corresponding to the data stream information needs to be modified, wherein the data stream information comprises information about the first device, information about a second device, service information, or network status information; and
    modifying, by the first device, the TCP parameter, to obtain a modified TCP parameter, when it is determined that the TCP parameter needs to be modified, wherein modifying the TCP parameter comprises:
        generating, by the first device, a first socket corresponding to the data stream; and
        modifying, by the first device, the TCP parameter using a data transfer protocol modification interface corresponding to the first socket, to obtain the modified TCP parameter.

2. The method according to claim 1, wherein the method further comprises:
    sending, by the first device, a data transfer protocol negotiation request message to the second device, wherein the data transfer protocol negotiation request message comprises the modified TCP parameter, and the data transfer protocol negotiation request message requests the second device to determine whether the modified TCP parameter meets a preset modification condition;
    receiving, by the first device, a feedback message sent by the second device; and
    generating a modification result of the TCP parameter according to the feedback message.

3. The method according to claim 2, wherein the data transfer protocol negotiation request message is a data transfer protocol packet, and the modified TCP parameter is used as an option in the data transfer protocol packet.

4. The method according to claim 1, wherein the data transfer protocol modification interface comprises:
    a general socket programming interface and a new application programming interface (API).

5. A first device, comprising:
    a processor; and
    a non-transitory computer readable medium which contains computer-executable instructions;
    wherein the processor is configured to execute the computer-executable instructions to enable the first device to perform operations comprising:
        determining, according to data stream information, whether a Transmission Control Protocol (TCP) parameter associated with a data stream corresponding to the data stream information needs to be modified, wherein the data stream information comprises information about the first device, information about a second device, service information, or network status information;
        modifying the TCP parameter, to obtain a modified TCP parameter, when it is determined that the TCP parameter needs to be modified, wherein modifying the TCP parameter comprises:
    generating a first socket corresponding to the data stream; and
    modifying the TCP parameter using a data transfer protocol modification interface corresponding to the first socket, to obtain the modified TCP parameter.

6. The first device according to claim 5, wherein the processor is further configured to execute the computer-executable instructions to enable the first device to perform operations comprising:

sending a data transfer protocol negotiation request message to the second device, wherein the data transfer protocol negotiation request message comprises the modified TCP parameter, and the data transfer protocol negotiation request message requests the second device to determine whether the modified TCP parameter meets a preset modification condition;

receiving a feedback message sent by the second device; and generating a modification result of the TCP parameter according to the feedback message.

7. The first device according to claim 6, wherein the data transfer protocol negotiation request message is a data transfer protocol packet, and wherein the modified TCP parameter is used as an option in the data transfer protocol packet.

8. The first device according to claim 5, wherein the data transfer protocol modification interface comprises:
a general socket programming interface and a new application programming interface (API).

9. A second device, comprising:
a processor; and
a non-transitory computer readable medium which contains computer-executable instructions;
wherein the processor is configured to execute the computer-executable instructions to enable the second device to perform operations comprising:
receiving a data transfer protocol negotiation request message sent by a first device, wherein the data transfer protocol negotiation request message comprises a modified Transmission Control Protocol (TCP) parameter that was modified by the first device;
determining whether the modified TCP parameter meets a preset modification condition; and
generating a feedback message, and sending the feedback message to the first device.

10. The second device according to claim 9, wherein the modified TCP parameter comprises:
an initial congestion window;
a congestion window for retransmission after timeout;
a congestion window for fast recovery;
a slow start threshold;
a slow start threshold for retransmission after timeout;
a congestion window threshold for fast recovery;
a slow start step;
a congestion avoidance step;
a congestion control algorithm;
a receive window;
a slow start ACK response frequency;
a congestion avoidance ACK response frequency;
a fast recovery ACK response frequency;
a normal transmission ACK response frequency; or
a maximum packet length.

11. A first device, comprising:
a processor; and
a non-transitory computer readable medium which contains computer-executable instructions;
wherein the processor is configured to execute the computer-executable instructions to enable the first device to perform operations comprising:
determining, according to data stream information, that a Transmission Control Protocol (TCP) parameter associated with a data stream corresponding to the data stream information needs to be modified;
generating a first socket corresponding to the data stream; and modifying the TCP parameter using a data transfer protocol modification interface corresponding to the first socket to obtain a modified TCP parameter.

12. The first device according to claim 11, wherein the data stream information comprises information about the first device, information about a second device, service information, or network status information.

13. The first device according to claim 11, wherein the processor is further configured to execute the computer-executable instructions to enable the first device to perform an operation comprising:
generating a modification result of the TCP parameter.

14. A first device, comprising:
a processor; and
a non-transitory computer readable medium which contains computer-executable instructions;
wherein the processor is configured to execute the computer-executable instructions to enable the first device to perform operations comprising:
determining, according to data stream information, that a Transmission Control Protocol (TCP) parameter associated with a data stream corresponding to the data stream information needs to be modified to a target value;
sending a data transfer protocol negotiation request message to a second device, wherein the data transfer protocol negotiation request message comprises the target value, and the data transfer protocol negotiation request message requests the second device to determine whether the target value meets a preset modification condition;
receiving a feedback message sent by the second device, wherein the feedback message indicates that the target value meets the preset modification condition; and
generating a modification result of the TCP parameter according to the feedback message, wherein the modification result indicates a modification of the TCP parameter is successful.

15. The first device according to claim 14, wherein the data stream information comprises information about the first device, information about the second device, service information, or network status information.

16. The first device according to claim 14, wherein before the operation of sending the data transfer protocol negotiation request message, the processor is further configured to execute the computer-executable instructions to enable the first device to perform an operation comprising:
modifying the TCP parameter to the target value.

17. A method, comprising:
determining, by a first device and according to data stream information, that a Transmission Control Protocol (TCP) parameter associated with a data stream corresponding to the data stream information needs to be modified to a target value;
sending, by the first device, a data transfer protocol negotiation request message to a second device, wherein the data transfer protocol negotiation request message comprises the target value, and the data transfer protocol negotiation request message requests the second device to determine whether the target value meets a preset modification condition;
receiving, by the first device, a feedback message sent by the second device, wherein the feedback message indicates that the target value meets the preset modification condition; and generating, by the first device, a modification result of the TCP parameter according to the feedback message, wherein the modification result indicates a modification of the TCP parameter is successful.

* * * * *